(No Model.)

H. McCLUEY.
DETACHABLE PLOW POINT.

No. 382,179. Patented May 1, 1888.

Witnesses:
Geo. Thrope
J. H. Siggers

Inventor,
Hugh McCluey.
By his Attorneys,
C. A. Snow & Co.

UNITED STATES PATENT OFFICE.

HUGH McCLUEY, OF KEOKUK, IOWA.

DETACHABLE PLOW-POINT.

SPECIFICATION forming part of Letters Patent No. 382,179, dated May 1, 1888.

Application filed January 25, 1888. Serial No. 261,829. (No model.)

*To all whom it may concern:*

Be it known that I, HUGH McCLUEY, a citizen of the United States, residing at Keokuk, in the county of Lee and State of Iowa, have invented a new and useful Improvement in Detachable Points for Cultivator Shovels and Plows, of which the following is a specification.

My invention relates to an improvement in detachable points for cultivator shovels and plows; and it consists in a hollow point or envelope adapted to be slipped on the point of a cultivator shovel or plow, and provided with means to secure the same in position on the said cultivator shovel or plow, as will be more fully set forth hereinafter, and particularly pointed out in the claim.

Figure 1:
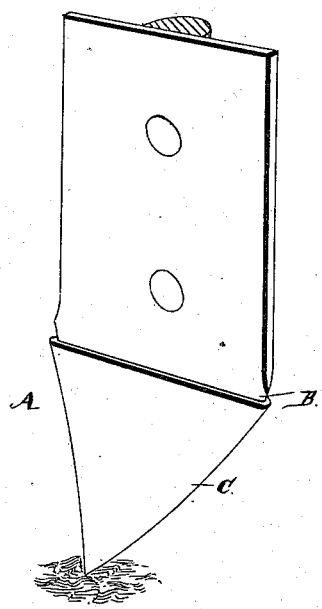
Figure 2:
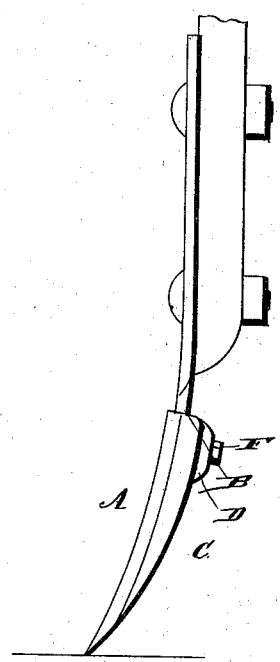
Figure 3:
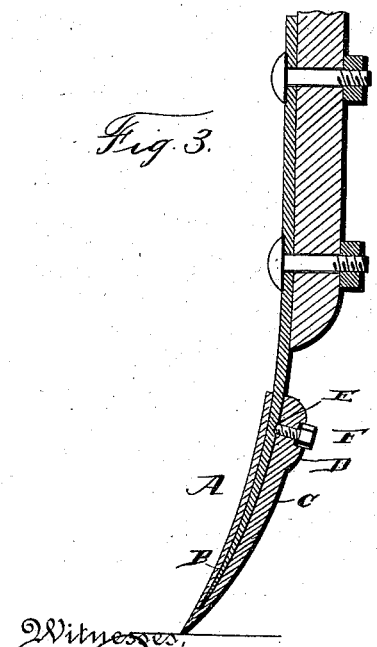
Figure 4:
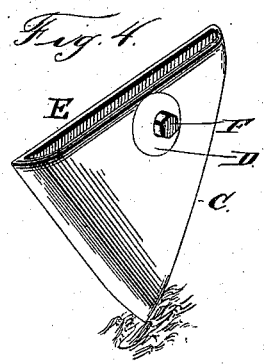

In the accompanying drawings, Figure 1 is a perspective view of a cultivator shovel or tooth provided with a detachable point embodying my improvement. Fig. 2 is a side elevation of the same. Fig. 3 is a vertical central sectional view of the same. Fig. 4 is a detached perspective view of my improved detachable point.

A represents a cultivator shovel or tooth of the usual construction, which is provided at its lower end with the forwardly-inclined point B, the side edges of which are beveled, as shown. Cultivator shovels or teeth thus constructed frequently have their points broken or indented when in operation, thereby greatly impairing their utility and rendering it necessary either to sharpen the broken point or to entirely discard the shovel or tooth and substitute a new one therefor. I propose to obviate these objections by providing a detachable point, C, for the cultivator shovel or tooth, the said detachable point being made preferably of cast-steel, and being hollow and conforming to the shape of the point of the cultivator shovel or tooth, and thereby adapted to fit thereon, as shown.

On the rear side of my improved detachable point C is a boss or offset, D, having a central threaded opening which communicates with the opening E in the point. In the said threaded opening is a set screw, F, which is adapted to be turned by means of a wrench.

This detachable hollow point is slipped on the tongue of the shovel or tooth A, and is secured thereto by turning the screw F so as to cause the point of the latter to firmly impinge against the rear side of the point of the shovel or tooth. When the detachable point becomes dulled or broken, it may be readily removed and sharpened, or thrown away and replaced by a new one.

The detachable point C covers the entire inclined edge of the cultivator-point, thus re-enforcing all the narrower portion of the point, and rising sufficiently high to prevent dirt or sand being introduced between itself and the cultivator, which dirt or sand would tend to grind the surface of one on the surface of the other.

Having thus described my invention, I claim—

The combination, with the cultivator-tooth A, of the hollow detachable point C, covering the entire inclined portion of the point A, in order to re-enforce the same and exclude all dirt and sand from between the two points, and the set screw passing through a tapped opening of the point C and impinging on the point A, substantially as specified.

In testimony that I claim the foregoing as my own I have hereto affixed my signature in presence of two witnesses.

HUGH McCLUEY.

Witnesses:
C. W. SUNSTODTT,
W. S. McNAMARA.